United States Patent [19]

DeGraaf

[11] Patent Number: 5,740,405

[45] Date of Patent: Apr. 14, 1998

[54] METHOD AND SYSTEM FOR PROVIDING DATA COMPATIBILITY BETWEEN DIFFERENT VERSIONS OF A SOFTWARE PROGRAM

[75] Inventor: Kevin Henry DeGraaf, Seattle, Wash.

[73] Assignee: Microsoft Corporation, Redmond, Wash.

[21] Appl. No.: 992,069

[22] Filed: Dec. 17, 1992

[51] Int. Cl.⁶ .................................................. G06F 17/30
[52] U.S. Cl. ............................................ 395/500; 395/619
[58] Field of Search ...................... 395/500, 934, 395/616, 619, 620

[56] References Cited

U.S. PATENT DOCUMENTS

| | | | |
|---|---|---|---|
| 4,667,290 | 5/1987 | Goss et al. | 395/700 |
| 4,734,854 | 3/1988 | Afshar | 395/700 |
| 4,751,740 | 6/1988 | Wright | 382/1 |
| 4,791,558 | 12/1988 | Chaitin et al. | 395/500 |
| 4,864,503 | 9/1989 | Tolin | 364/419.02 |
| 4,970,665 | 11/1990 | Doi et al. | 395/148 |
| 5,230,049 | 7/1993 | Chang et al. | 395/700 |

OTHER PUBLICATIONS

Baumgarten et al. "Using WordPerfect 5.1", Special Edition 1989, Que Corp. pp. 305–315, pp. 345–348, pp.370–391, pp. 533–556, pp. 835–845.

*Primary Examiner*—Parshotam S. Lall
*Assistant Examiner*—Viet Vu
*Attorney, Agent, or Firm*—Seed and Berry LLP

[57] ABSTRACT

The present invention provides a computer system for providing data compatibility between different versions of a computer program. The computer system comprises a memory which stores a later version of a computer program and a prior version of the computer program. A user of the computer system invokes the prior version of the computer program, creates a file, and requests that the file be saved on a permanent storage device. The computer system of the present invention automatically saves the file in both a version dependent external format and a version independent data format. When the user of the computer system invokes the later version of the computer program and requests to process the data stored in the file, the computer system determines whether the data stored in the version dependent external format can be processed by the later version of the computer program. When the data cannot be processed by the later version of the computer program, the computer system retrieves the data in the version independent data format. The later version of the computer program converts the retrieved data to a version dependent internal format that can be processed by the later version of the computer program. The later version of the computer program then processes the converted data.

8 Claims, 16 Drawing Sheets

METHOD AND SYSTEM FOR PROVIDING DATA COMPATIBILITY BETWEEN DIFFERENT VERSIONS OF A SOFTWARE PROGRAM

TECHNICAL FIELD

This invention relates generally to a computer method and system for providing compatibility between different versions of a computer program, and more specifically, to a computer method and system for providing compatibility between different versions of the computer program by saving data in two data formats.

BACKGROUND OF THE INVENTION

Data compatibility, the degree to which a program can understand the data format of another program, has been a common concern of computer users and has been the focus of industry attempts to establish standards that will enable software to work together. As program-to-program file sharing becomes a near-essential aspect of computer operation, data compatibility becomes increasingly important. In particular, backward compatibility, the ability of a program to work with and understand the data formats of earlier versions of the same program, becomes increasingly important.

Existing application programs typically provide for backward compatibility. A current version of an application program stores its data on a permanent storage device in an external format particular to the current version of the application program (i.e., a version dependent external format). A new version of the application program stores its data in an external format particular to its version of the application program. For a later version of the application program to process files stored in external formats of previous versions of the application program, the later version of the application program needs to be able to read in the data stored in the previous version dependent external format. In order to ensure a full range of backward compatibility, each version of the application program needs to be able to read in data stored in each previous version dependent external format. While each version of an application program may store data in computer memory in a version dependent internal format, backward compatibility generally refers to external formats and not internal formats.

A specific example will help illustrate how existing application programs ensure backward compatibility. FIG. 1 is a block diagram illustrating a method for storing data in a version dependent external format. In FIG. 1, a user of system 100 launches a first version of a word processing program 107. Then the user requests the word processing program 107 to create a document. Next, the user inputs data for the document. The word processing program 107 receives the input data and stores the input data in the version one internal format. When the user directs, the word processing program 107 automatically saves the input data to a file on the permanent storage device 103 in the version one external format using a save subprogram 108. As FIG. 3A illustrates, the save subprogram 108 retrieves the input data in the version one internal format and outputs the input data in the version one external format.

As FIG. 2 illustrates, the version one external format contains a version number section 201 which stores a version number of the external format, a pointer section 202 which stores a beginning address of each line of input data, and a data section 203 which stores the input data. The "/" character is used in the version one external format to indicate the end of a line of text. One skilled in the art would appreciate that typical word processors use much more complex data structures for storing data. One skilled in the art would also appreciate that typical save subprograms would be correspondingly more complex.

FIG. 1 illustrates a state of the system 100 after the word processing program 107 stores the input data in the version one external format (referred to as "document 110").

Existing word processing programs allow the input data to be saved on the permanent storage device in a format other than the version external format (the default format). If the user wants to save the input data in another format, then the user must request such an action and must specify the new data format. For example, the user may request the word processing program 107 to save the input data in a version independent data format. The version independent data format is a data format that is recognized and can be processed by other application programs. A typical version independent data format is as described in FIG. 4. The user typically chooses to save documents in a version independent data format when the user intends to use the data as input to another application program.

If the user inputs a request to save the input data in the version independent data format, then the word processing program 107 invokes the save subprogram 109. As FIG. 3B illustrates, the save subprogram 109 retrieves the input data from the version one internal format and outputs the input data in the version independent data format.

FIG. 4 illustrates the document 110 in the version independent data format. The version independent data format contains a data section 401 which stores the input data. The version independent data format uses a "CR" character and a "LF" character, in combination, to represent the end of a line of text.

As time goes by, software vendors typically upgrade their software products by creating new, improved versions of their software products. FIG. 5 is a block diagram illustrating a method for providing backward compatibility. A user of system 500 launches a word processing program 507 ("the second version of the word processing program"). The user next inputs a request to modify the document 110 stored on the permanent storage device 503 in the version one external format.

When the word processing program 507 determines that the document 110 is stored in the version one external format, it then invokes a conversion subprogram 509. As FIG. 6 illustrates, the conversion subprogram 509 converts data in a version one external format to data in the version two internal format.

FIG. 7 illustrates the differences between the version one external format and the version two internal format. The version two internal format includes an index table 701 which stores pointers to a first memory address of each line of input data stored in a data table 702. The version two internal format also uses the "]" character to represent the end of a line, while the version one external format uses the "/" character to represent the end of the line.

Therefore, the conversion subprogram 509 converts the document 110 from the version one external format to the version two internal format by reading the data from the document 110 in the version one external format into the data table 702 of the computer memory 506 while converting any "/" characters it encounters to the "]" character and while creating the index table 701. At the completion of this conversion process, the conversion subprogram 509 has stored the document 110 in the version two internal format as document 510.

The word processing program 507 then can display the document 510 to the display device 513 for user processing. After processing the document 510, the user typically initiates a save request. The word processing program 507 receives the save request and automatically saves the document 510 in a version two external format on a permanent storage device 503 using a save subprogram 511.

FIG. 8 depicts a state of the system 500 after the word processing program 507 saves the document 510 on the permanent storage device 503 in the version two external format as document 810.

If the user wants to save the document 510 in a data format other than the version two external format, then the user must request such an action and must specify the new data format. For example, the user may send a request to the word processing program 507 to save the document 510 in the version independent data format. If the user requests the word processing program 507 to save the document 510 in the version independent data format, then the word processing program 507 converts the document 510 to a document in the version independent data format using the general method described above with respect to document 110 and FIG. 1, and saves the document on the permanent storage device 503.

A problem with the above-described system and method arises as the software vendor continues to create new versions of the word processing program. As illustrated by the example set forth above, the software vendor must create conversion subprograms to convert data from each existing version dependent external format to the current version dependent internal format. In other words, for the "n-th" version of the word processing program, n-1 conversion subprograms must be written. The process of writing n-1 conversion subprograms is both time consuming and expensive.

SUMMARY OF THE INVENTION

To achieve the objects and in accordance with the purpose of this invention, as implemented and described herein, the present invention provides a computer system for providing data compatibility between different versions of a computer program. The computer system comprises a memory which stores a later version of the computer program and a prior version of the computer program. A user of the computer system typically invokes the prior version of the computer program, creates a file, and requests that the file be saved on a permanent storage device. The prior version of the computer program automatically saves the file in both a version dependent external format and a version independent data format.

When the user of the computer system invokes the later version of the computer program and requests to process the data stored in the file, the later version of the computer program determines whether the data stored in the version dependent external format can be processed by the later version of the computer program. When the data can be processed by the later version of the computer program, the computer system loads the data into memory and the later version of the computer program processes the loaded data.

When the data cannot be processed by the later version of the computer program, the computer system retrieves the data in the version independent data format. The later version of the computer program converts the retrieved data to a version dependent internal format that can be processed by the later version of the computer program. The later version of the computer program then processes the converted data.

Another aspect of this invention allows the prior version of the computer program to process a file created by the later version of the computer program. When the user of the computer system requests to process the data stored in a file created by the later version of the computer program, using the prior version of the computer program, the prior version of the computer program determines if it can process data stored in the version dependent external format. When the data can be processed by the prior version of the computer program, the computer system loads the data into memory and the prior version of the computer program processes the loaded data.

When the data cannot be processed by the prior version of the computer program, the computer system retrieves the data in the version independent data format and converts the retrieved data to a version dependent internal format that can be processed by the prior version of the computer program.

DETAILED DESCRIPTION OF THE INVENTION

The present invention overcomes the problem in existing systems of having to write n-1 conversion subprograms in order to provide backward compatibility between n-versions of an application program while maintaining the efficiencies of version dependent internal formats. The present invention automatically stores the data for a document in one file in both a version dependent external format and a version independent data format. Therefore, even after a vendor has released the latest version of the application program, each file in the system has its data stored in at least the version independent data format. To process any file created by a previous version of the application program, the present invention writes one conversion program which converts any file from its version independent data format to the latest version dependent internal format.

An added advantage of the present invention is that it also provides forward compatibility between application programs. Because subsequent versions of the application program also store their files in both the version independent data format and the version dependent external format, the present invention merely uses the conversion program of the application program currently in use to convert any file created by a subsequent application program from its version independent data format to the version dependent internal format of the application program currently in use.

In a preferred embodiment of the present invention, the external format of a version of an application program is substantially similar to the internal format of the same version. This similarity allows for data in the external format to be loaded into the internal format with essentially no conversion.

Figure 1:
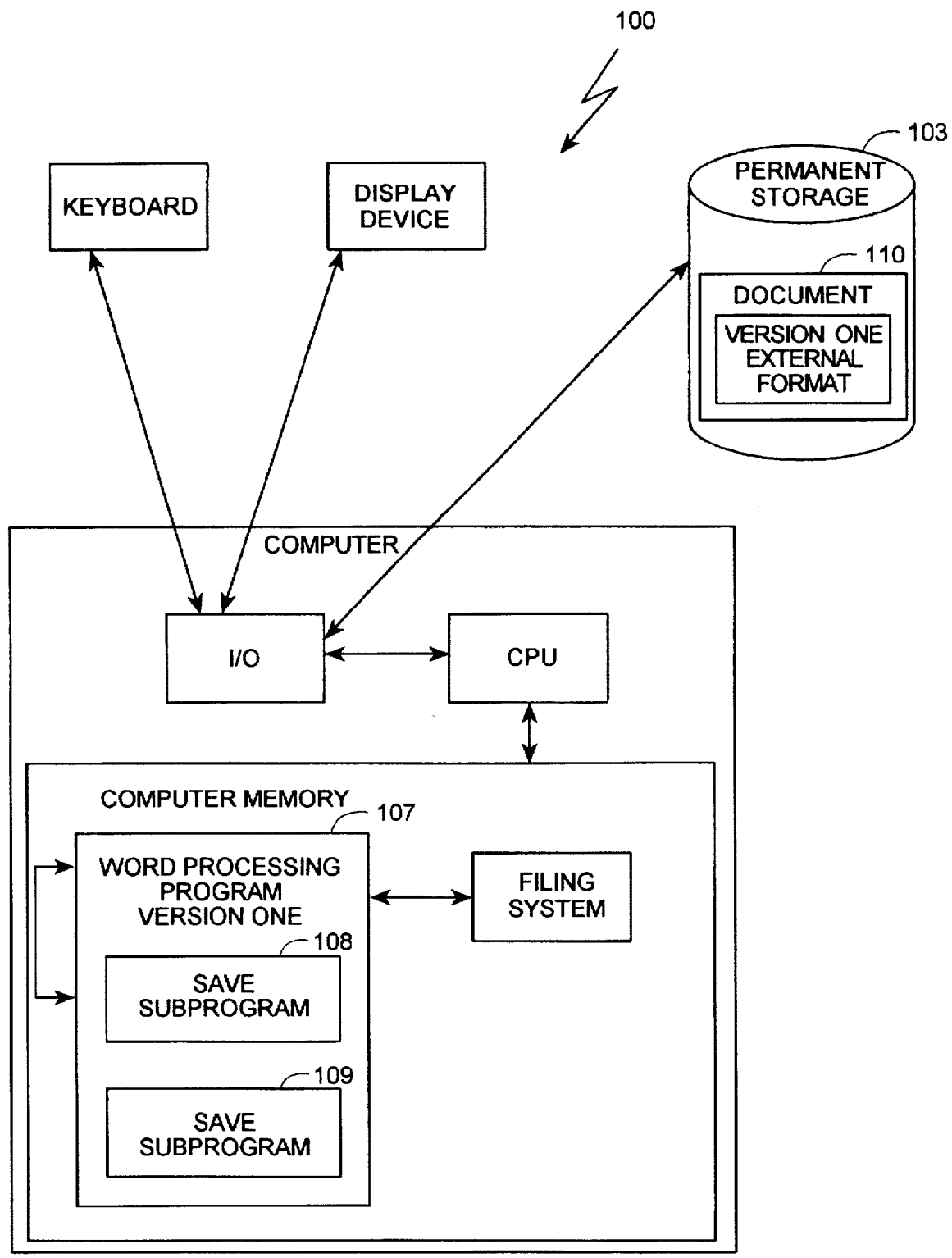
FIG. 1 is a block diagram of a computer system used to provide data compatibility between different versions of a computer program.
Figure 2:
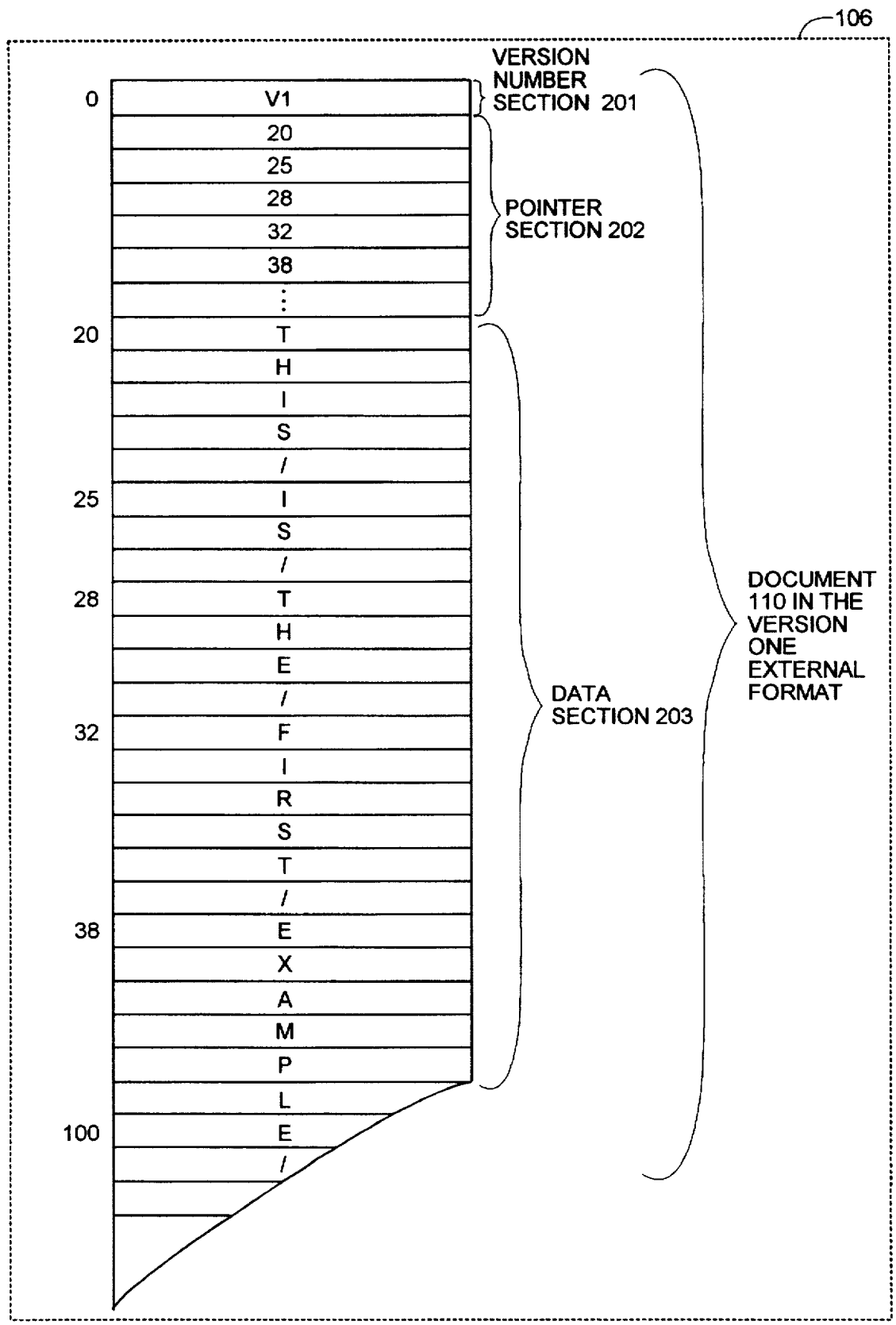
FIG. 2 is a diagram of a document stored in the version one external format.
Figure 3:
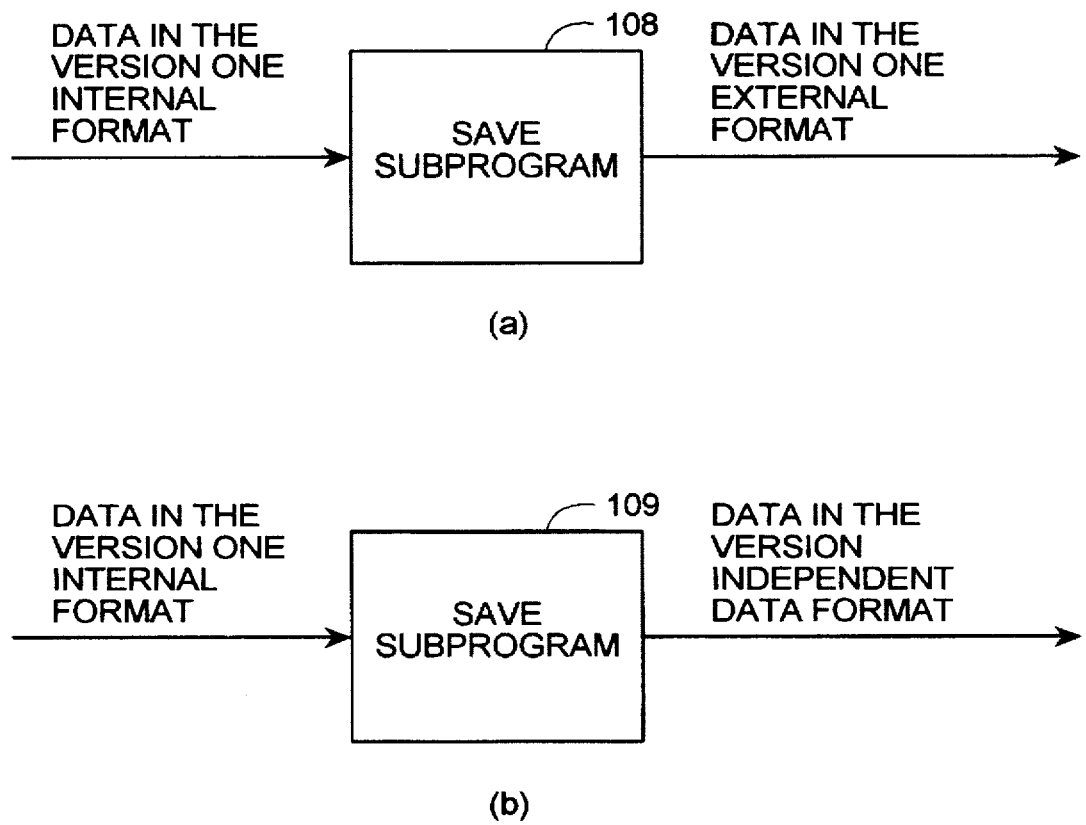
FIG. 3A is a block diagram of an input and an output of a save program that stores data in a version one external format.
FIG. 3B is a block diagram of an input and an output of a save program that stores data in a version independent format.
Figure 4:
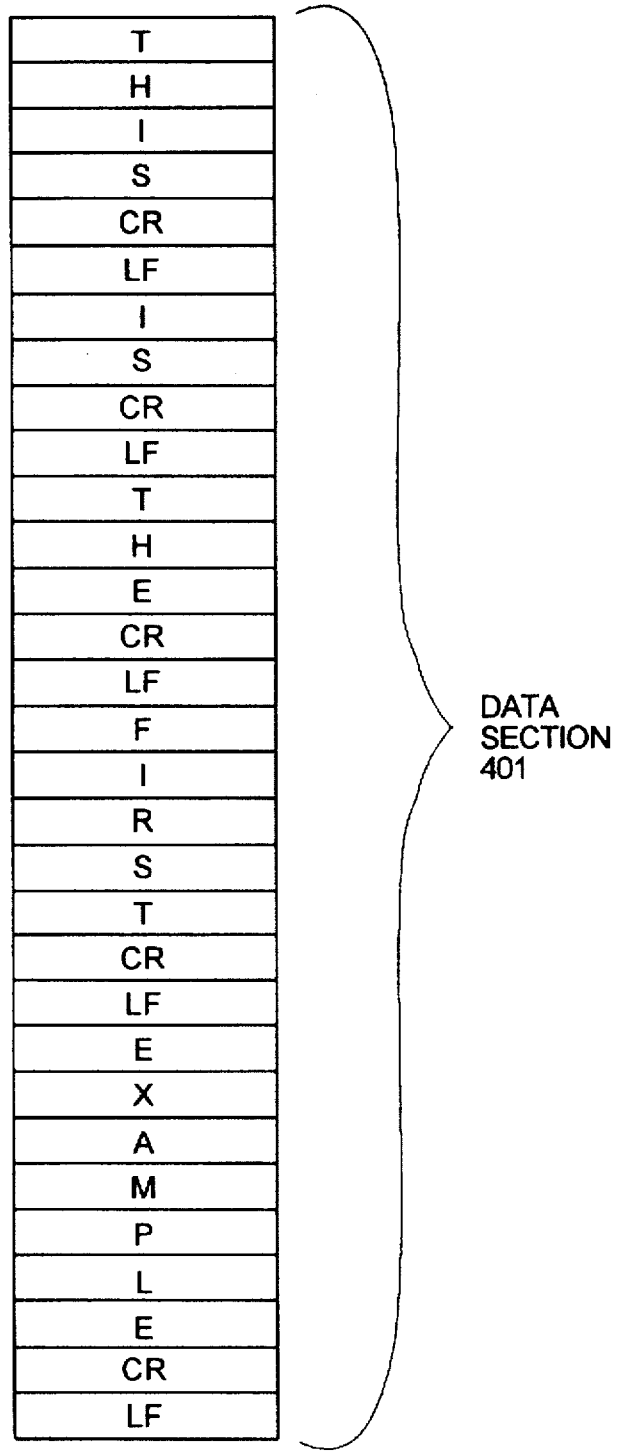
FIG. 4 is a block diagram of the data from the document version in the independent data format.
Figure 5:
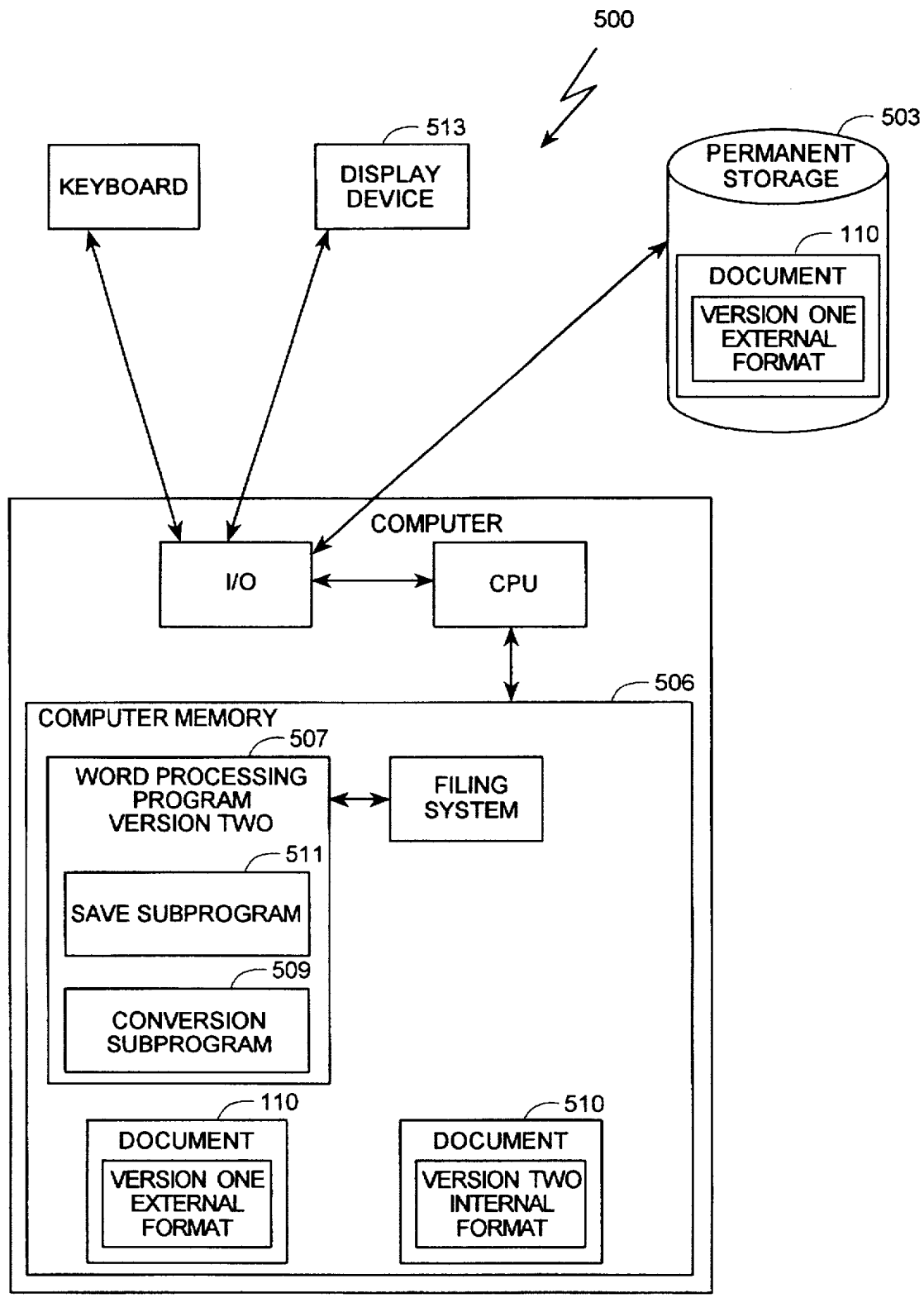
FIG. 5 is a block diagram of a computer system used to provide backward compatibility between different versions of a computer program.
Figure 6:
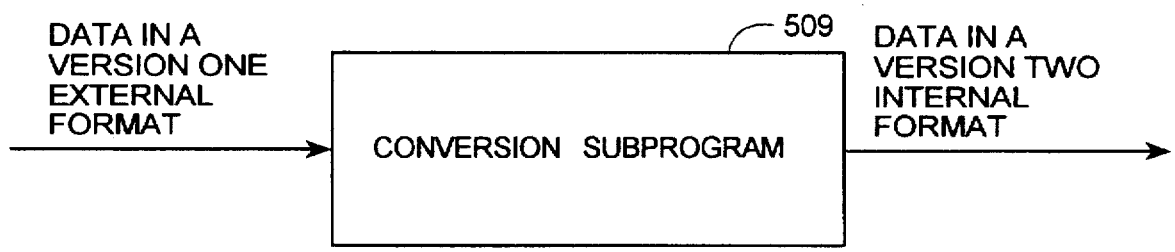
FIG. 6 is a block diagram of an input and output of a conversion program that converts to the version two internal format.
Figure 7:
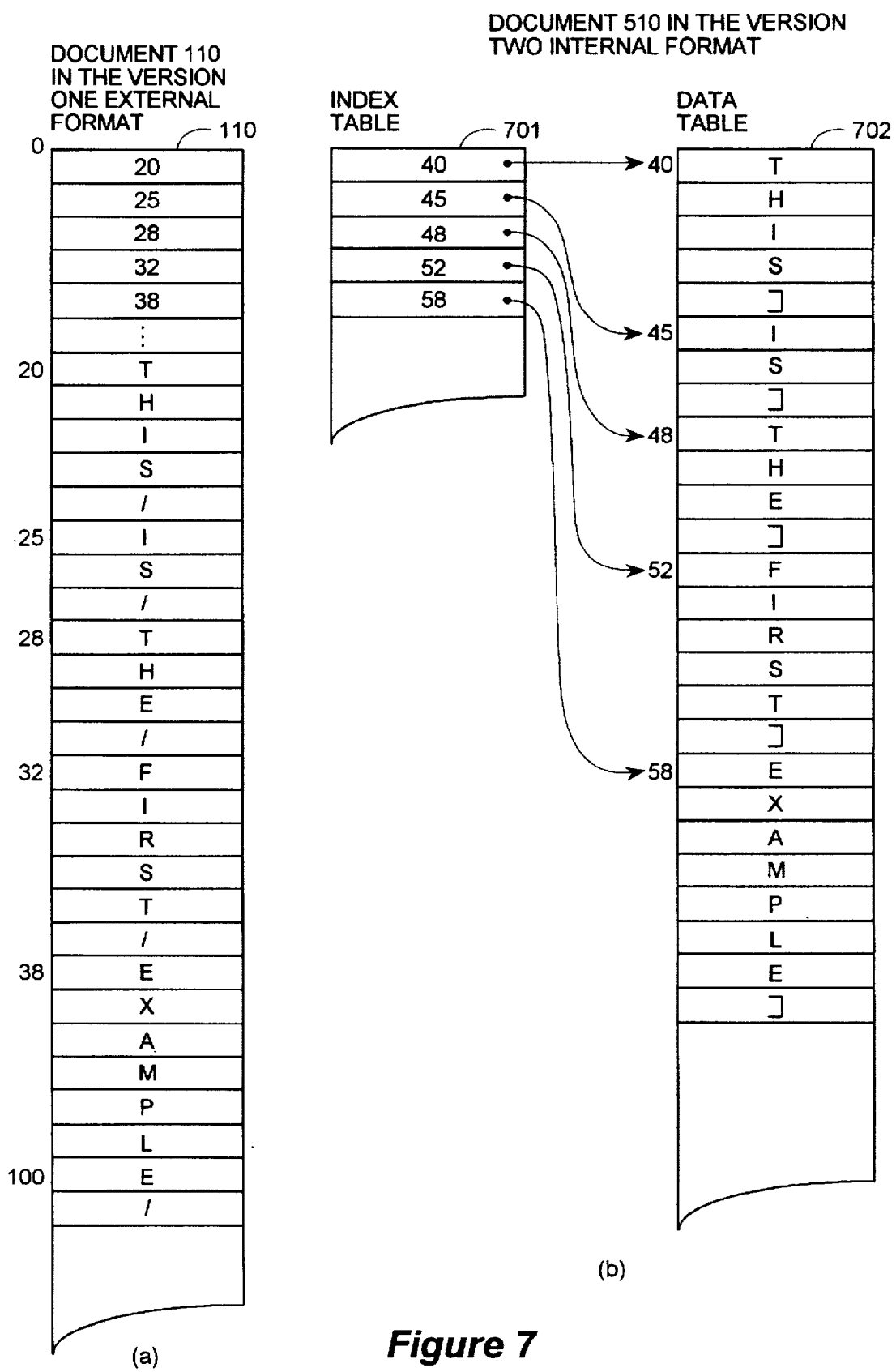
FIGS. 7A and 7B are block diagrams illustrating the differences between the version one external format and the version two internal format.
Figure 8:
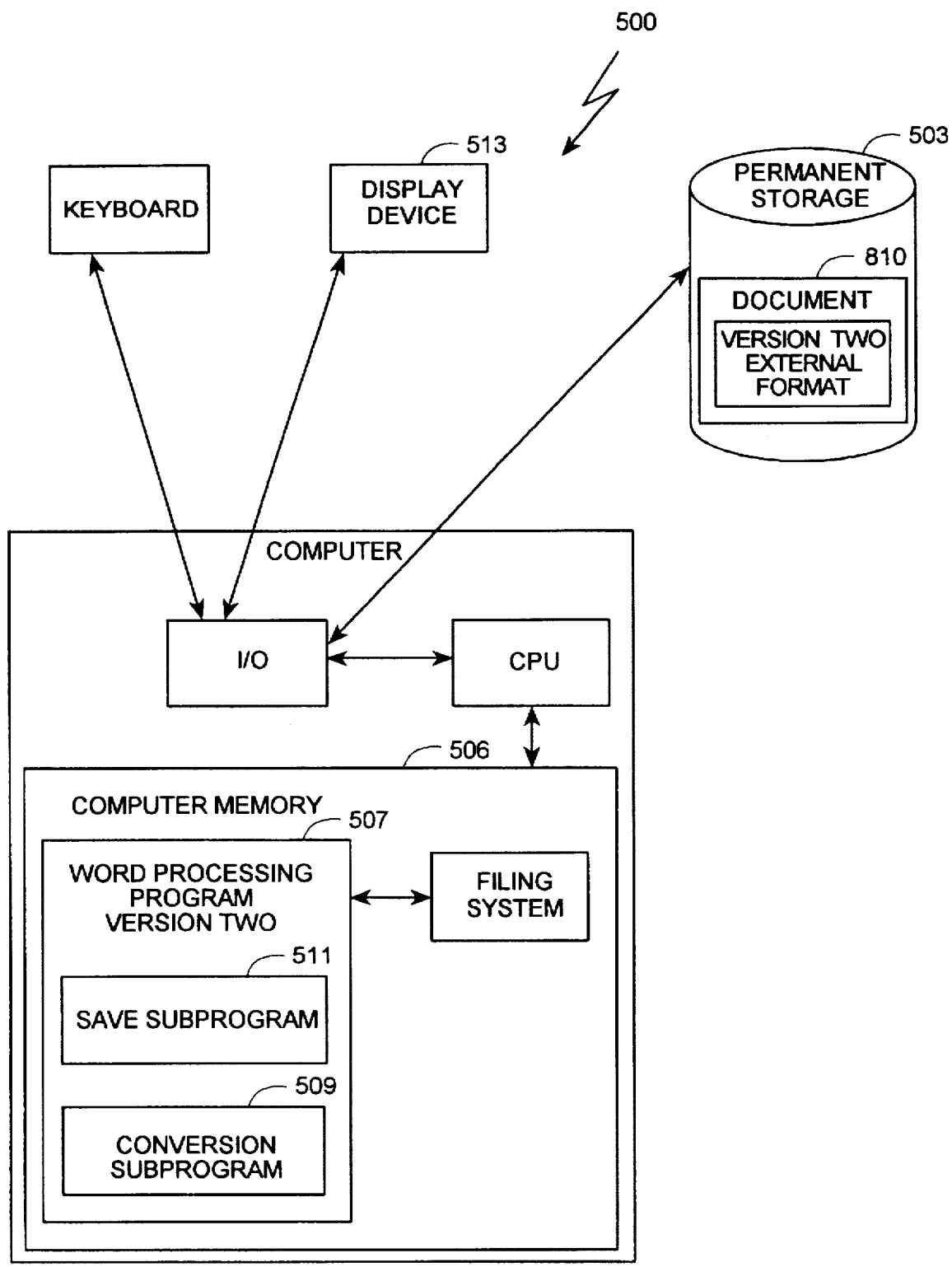
FIG. 8 is a block diagram of a computer system that provides backward capability after the document has been saved to a permanent storage device.
Figure 9:
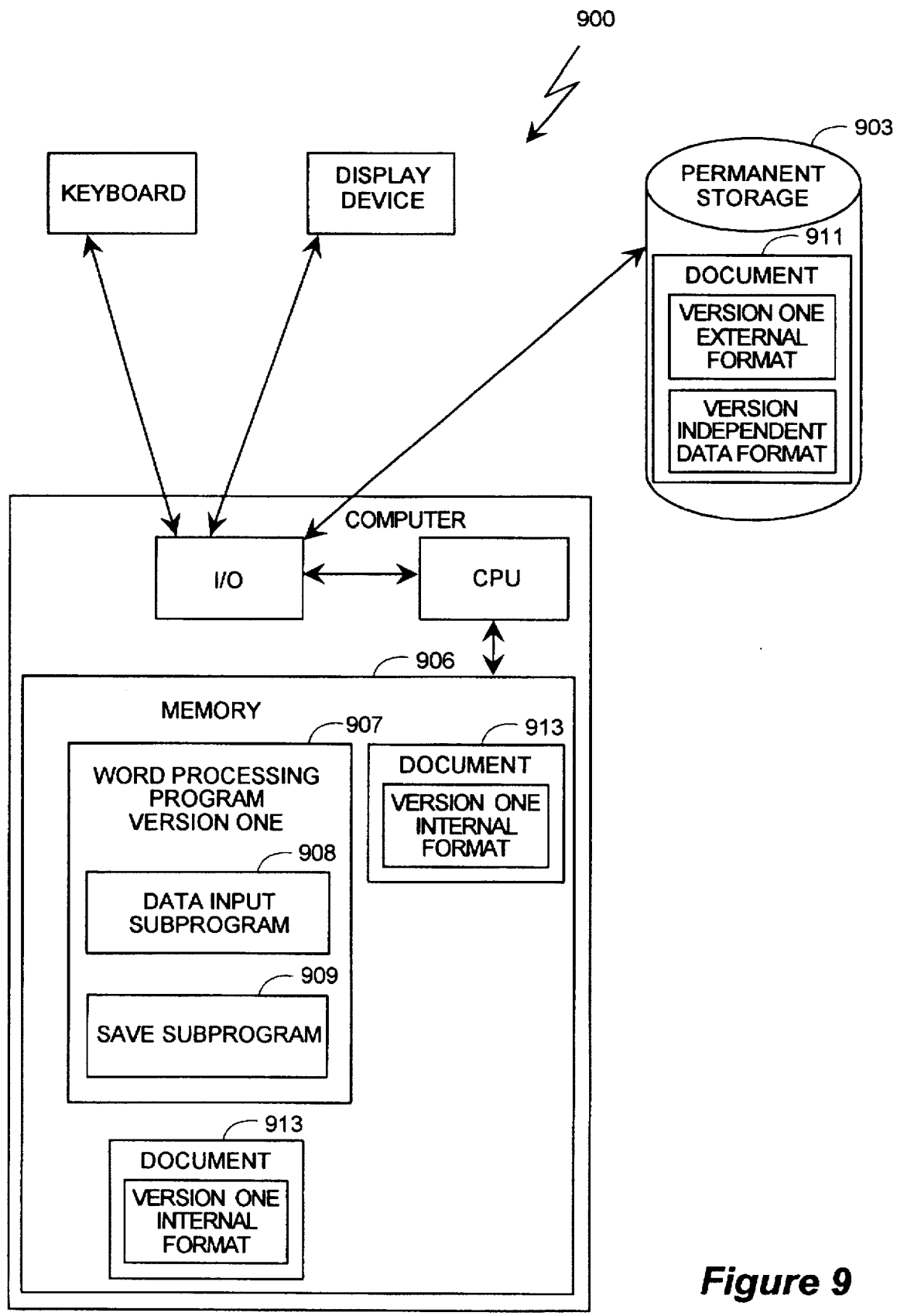
FIG. 9 is a block diagram of a computer system which can execute methods in accordance with a preferred embodiment of the present invention.

An example using FIGS. 9 through 13 will help illustrate the system and method of the present invention for providing both backward and forward compatibility. In FIG. 9, a user of the system 900 launches a first version of a word processing program 907. Then the user requests the word processing program 907 to create a document. Next, the user inputs data for the document. The word processing program 907 receives the input data and stores the input data in a version one internal format.

Figure 10:
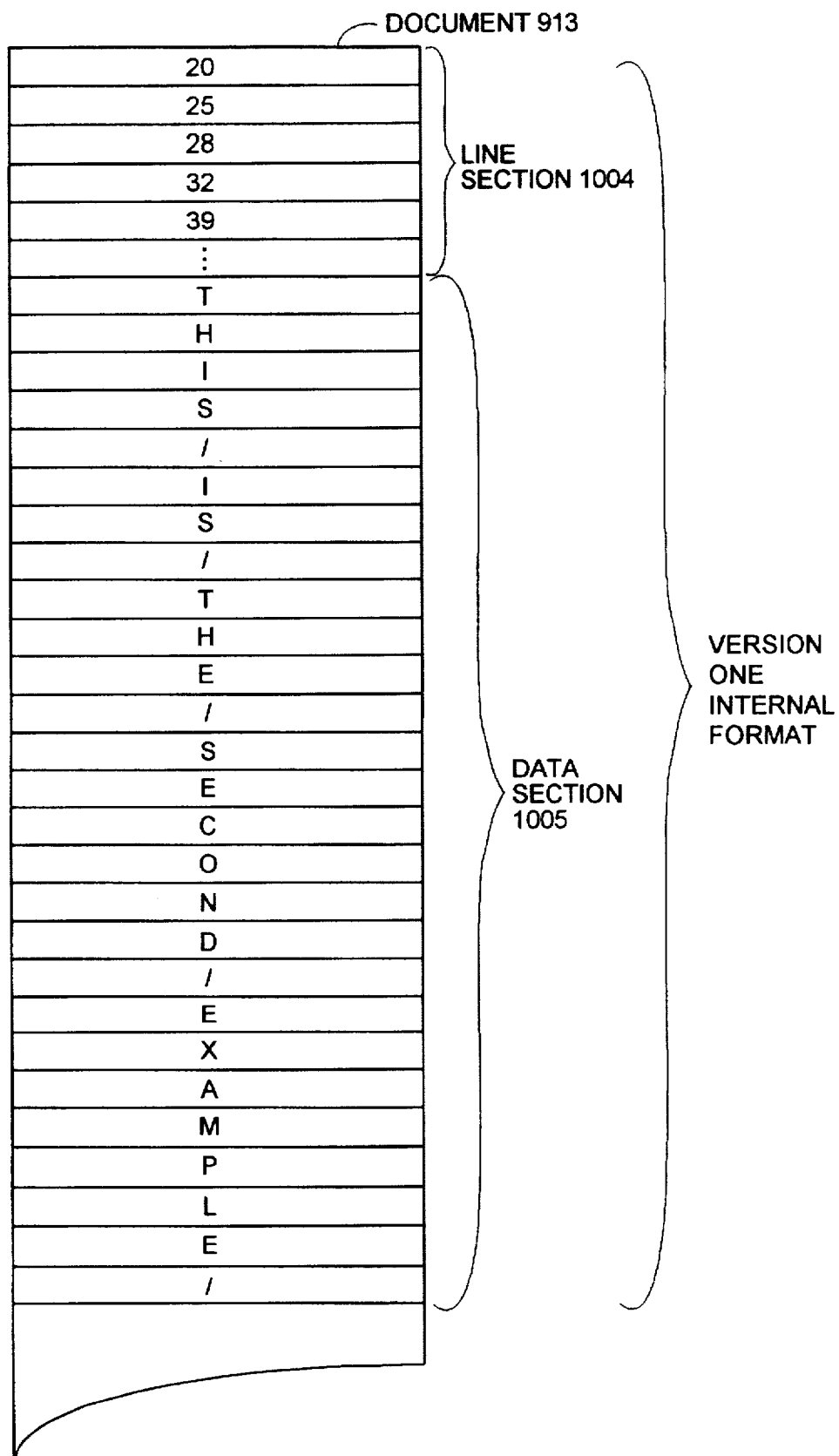
FIG. 10 is a block diagram of a document stored in a version one internal format.

FIG. 10 is a block diagram of the document 913 as it is stored in the memory 906 in a version one internal format. The document 913 includes, a data section 1005 which stores the input data, and a line section 1004 which stores pointers to a first memory address of each line of input data stored in the data section 1005.

The word processing program 907 stores the input data in the version one internal format using the following method. First the word processing program 907 invokes a data input subprogram 908 to retrieve the input data. The data input subprogram 908 stores a pointer to each line in the line section 1004 and stores each character of the line in the data section 1005 terminated by a "/." The data in FIG. 10 represents document 913.

The word processing program 907 then processes the document 913 in the version one internal format. When the user inputs a request to save the document, the word processing program 907 automatically saves the input data to one file in both the version one external format and the version independent data format.

Figure 11:
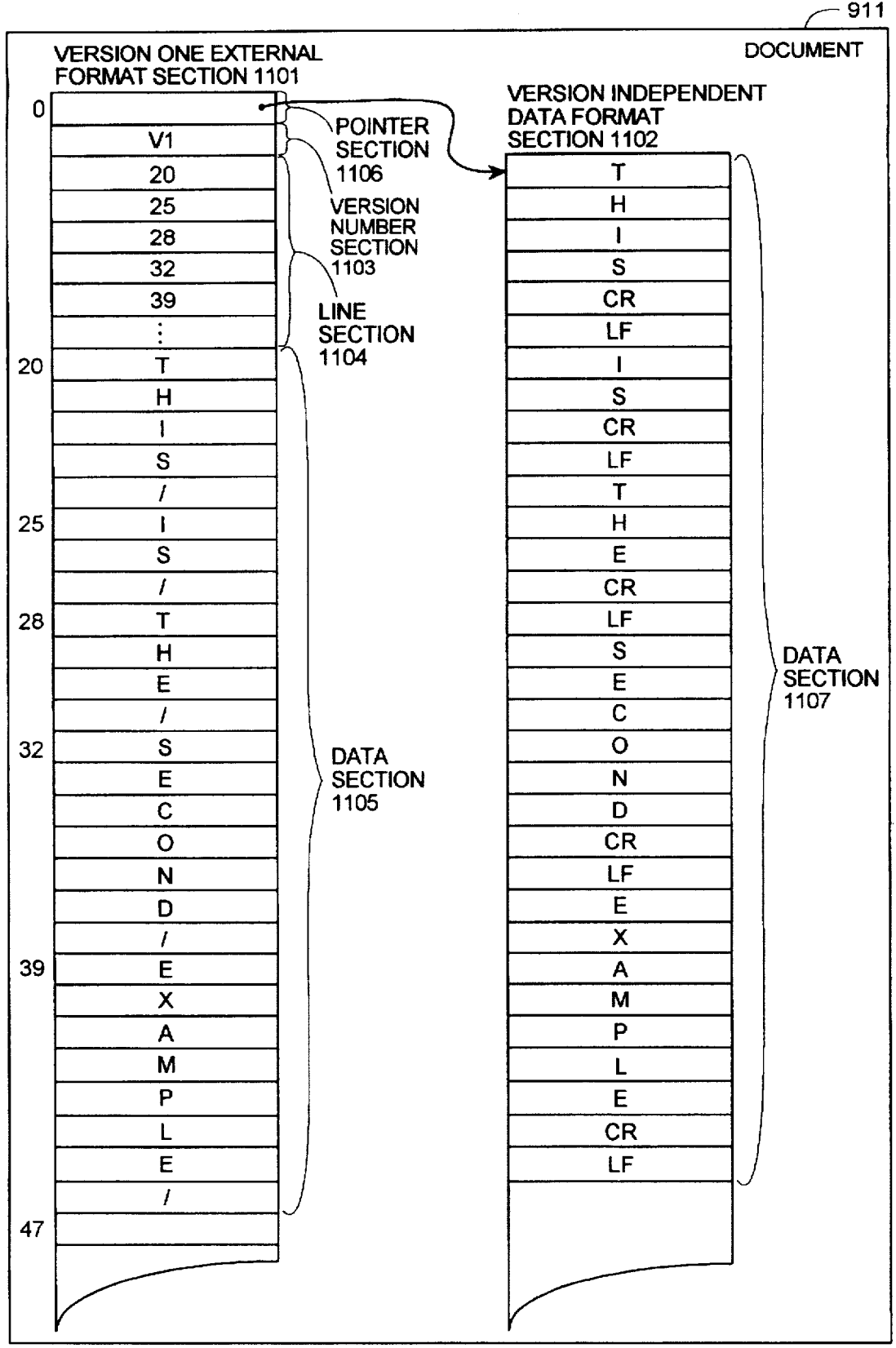
FIG. 11 is a block diagram of a document stored in both a version one external format and a version independent data format.

FIG. 11 is a block diagram of the document 911 as it is stored on a permanent storage device 903. The document 911 includes a version one external format section 1101 and a version independent data format section 1102. The version one external format section 1101 includes a version number section 1103 which stores a version number of the data format used to store the input data, a data section 1105 which stores the input data, and a line section 1104 which stores pointers to a first memory address of each line of input data stored in the data section 1105. The document 911 also includes a pointer section 1106, which stores a pointer to the version independent data format section 1102. The version independent data format section 1102 includes a data section 1107 which stores the input data.

The word processing program 907 saves the input data to one file in both the version dependent external format and the version independent data format using the following method. The word processing program 907 returns a pointer to the version independent data format section 1102 and stores the pointer in the pointer section 1106. The word processing program 907 then writes out the document 911 from internal memory 906 to the permanent storage device 903. Once the data from document 913 has been stored in the document 911 in the version one external format, the word processing program 907 then invokes the save subprogram 909. The save subprogram 909 accepts data in the version one internal format and outputs data in the version independent data format. To convert the input data from the version one internal format to the version independent data format, the save subprogram 909 writes each line to the data section 907 of the document 911 while inserting both a "CR" and a "LF" character at the end of each line of text instead of inserting the "/" character.

Figure 12:
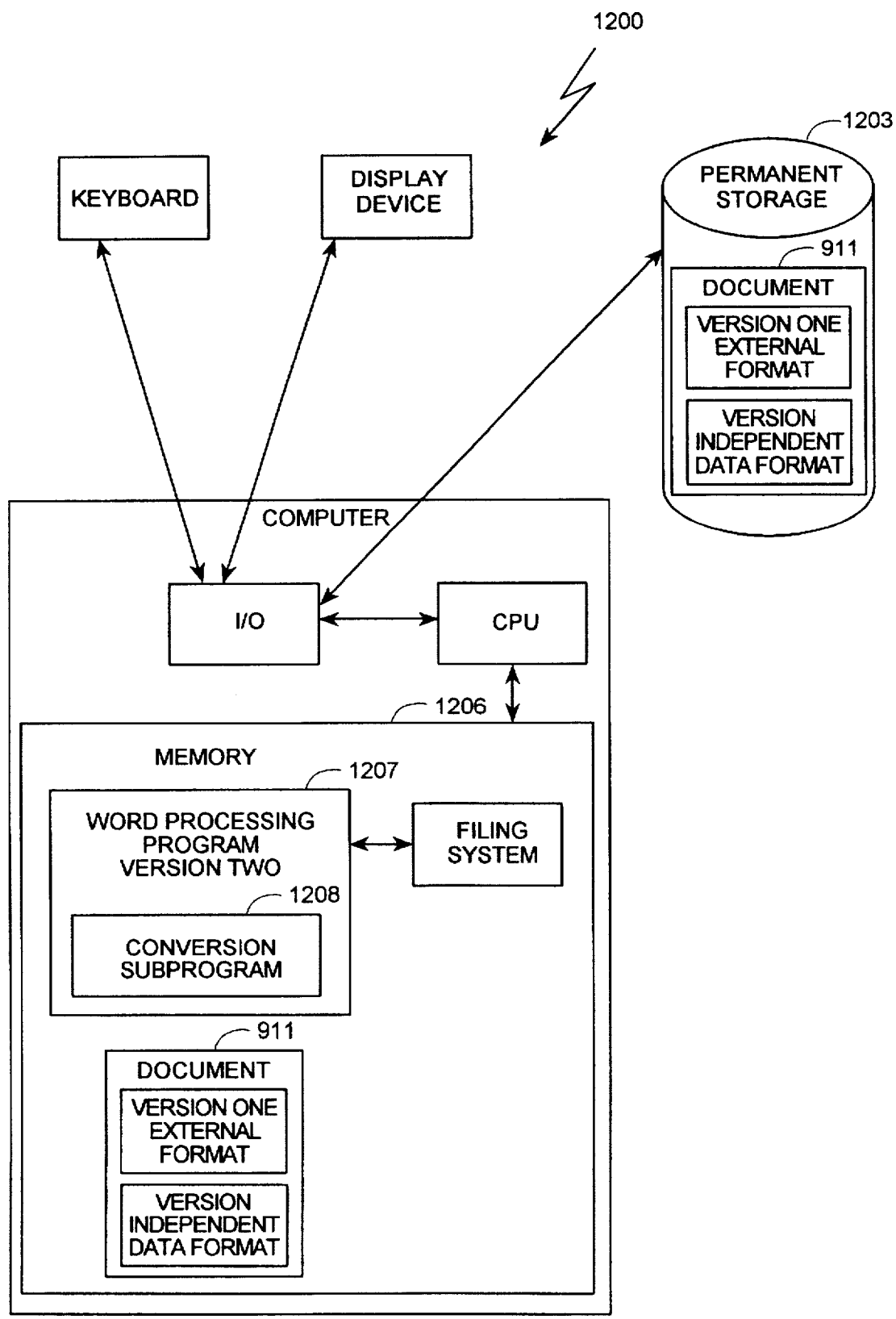
FIG. 12 is a block diagram of a computer system which provides data compatibility between different versions of a computer program in accordance with the preferred embodiment of the present invention.
Figure 13:
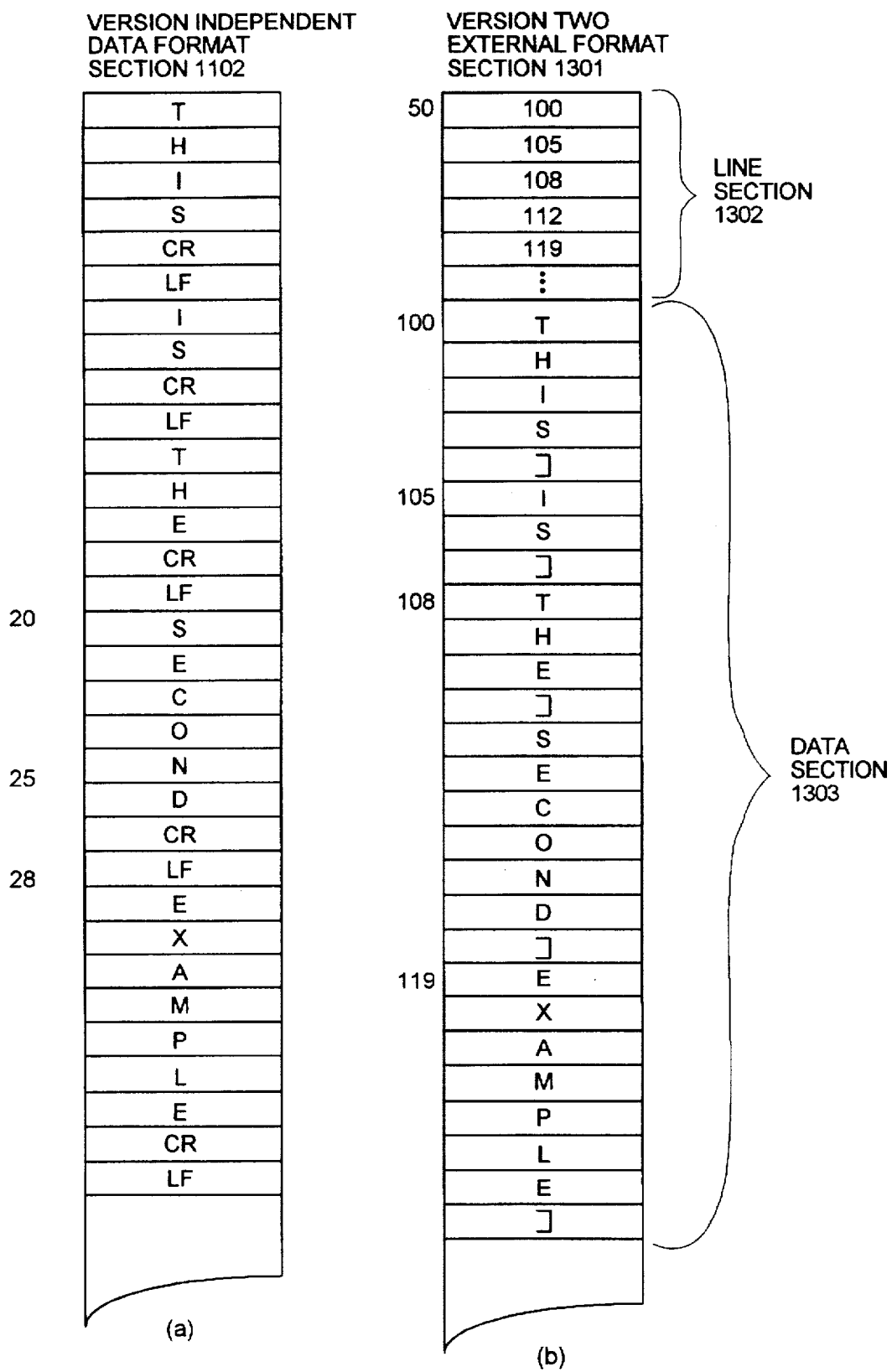
FIG. 13A is a block diagram of data in a version independent data format.
FIG. 13B is a block diagram of data in a version two external format.

As time goes by, software vendors typically upgrade their software products by creating new, improved versions of their software products. FIG. 12 is a block diagram of a system 1200 which provides compatibility between different versions of the word processing program. The system 1200 contains the document 911 which stores its data in both the version one external format and the version independent data format. The document 911 was discussed above with respect to FIGS. 9–11.

A user of the system 1200 typically launches a word processing program 1207 and inputs a request to modify the document 911 stored on a permanent storage device 1203. The word processing program 1207 then reads the data stored in the version number section 1103 (FIG. 11) and determines that the document 911 is stored in the version one external format. If the document 911 had stored its data in a version two external format (i.e., the version dependent data format for the second version of the word processing program) then the word processing program 1207 could have processed the data in the version two external format directly. However, since the document 911 stores its data in the version one external format, the word processing program 1207 converts the data from the version independent data format to the version two internal format. FIG. 13(b) is a block diagram of a portion of memory 1206 after the word processing program 1207 converts the data from the version independent data format to the version two internal format.

The word processing program 1207 uses the following conversion method. First, the word processing program 1207 retrieves the pointer to the version independent data format section 1102 from the pointer section 1106. The word processing program 1207 then invokes a conversion subprogram 1208, passing the conversion subprogram 1208 the pointer to the version independent data format section 1102 (FIG. 11).

Conversion subprogram 1208 stores the first memory address of the data section 1303 (FIG. 13(b)) as the first entry in the pointer section 1302. The conversion subprogram 1208 then stores each character of data from the version independent data format section 1102 in contiguous memory locations of the data section 1303, starting with the first memory location of the data section 1303, until the word processing program 1207 encounters an end of a line of text. The end of the line of text in the version independent data format is represented by the "CR" character in combination with the "LF" character. Therefore, when the conversion subprogram 1208 encounters the end of the line of text, it discards the "CR" and "LF" characters and instead stores a "]" character in the next available memory location of the data section 1303.

Next, the conversion subprogram 1208 stores the beginning address of the next line of text in the next available memory location in the line section 1302. The conversion subprogram 1208 continues to read data from the version independent data format section 1102 until it again encounters the end of a line of text. The conversion subprogram 1208 discards the "CR" and "LF" characters and stores a "]" character in the next available memory location of the data section 1303 to indicate the end of the line of text. This process continues until the conversion subprogram 1208 stores all the data from the version independent data format section 1102 in the version two internal format section 1301. One skilled in the art would appreciate that typical word processors use much more complex data structures for storing data. Similarly, one skilled in the art would appreciate that typical conversion programs would be correspondingly more complex.

The word processing program 1207 now processes the data stored in the version two internal format section 1301. When the user directs, the word processing program 1107 automatically saves the document 911 to one file in both the version two external format and the version independent data format.

Figure 14:
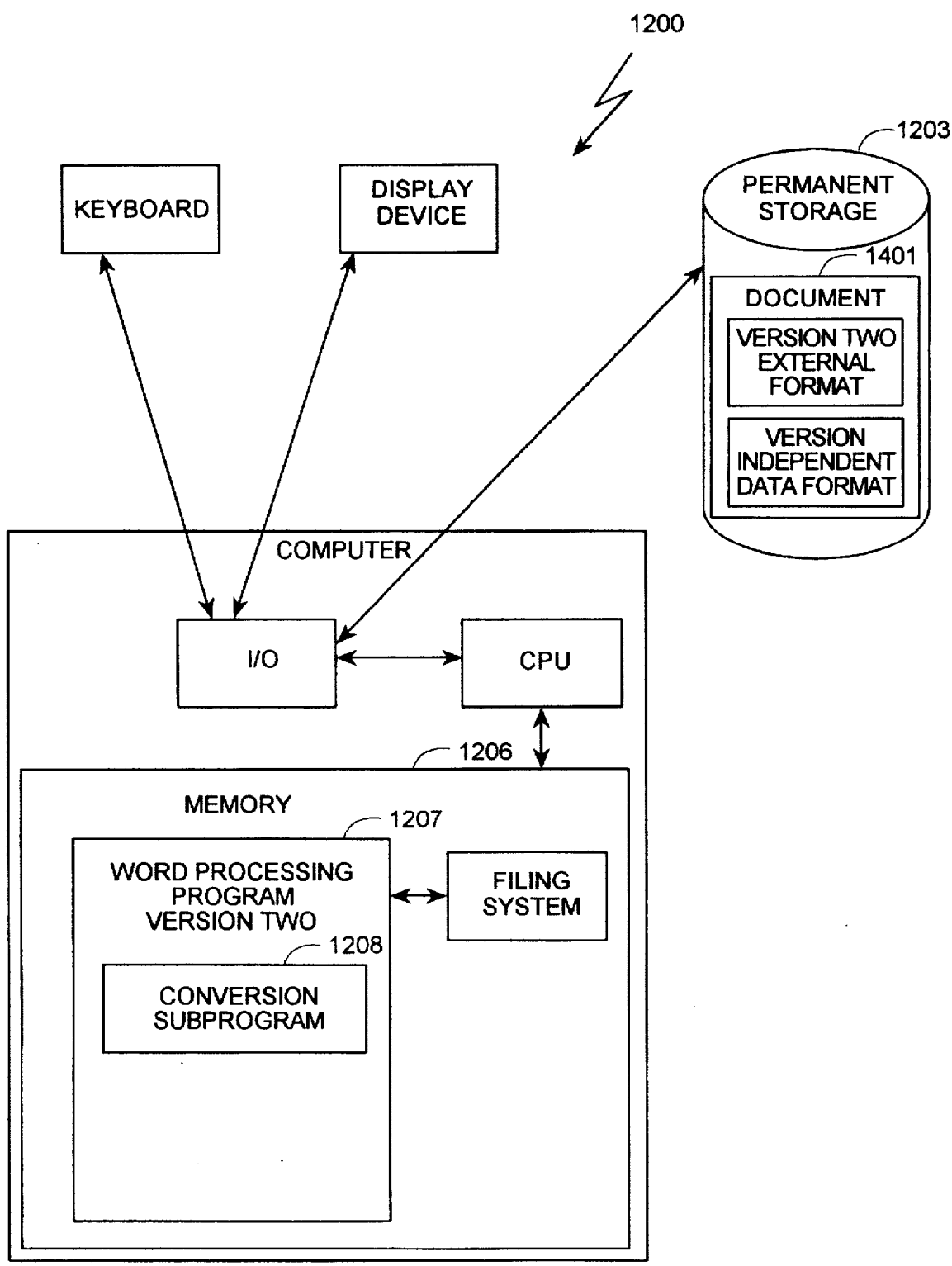
FIG. 14 is a block diagram of a computer system that stores a document with data in both the version two external format and the version independent data format.

FIG. 14 is a block diagram of the system 1200 after the word processing program 1207 saves document 911 as document 1401 with data in both the version two external format and the version independent data format.

Figure 15:
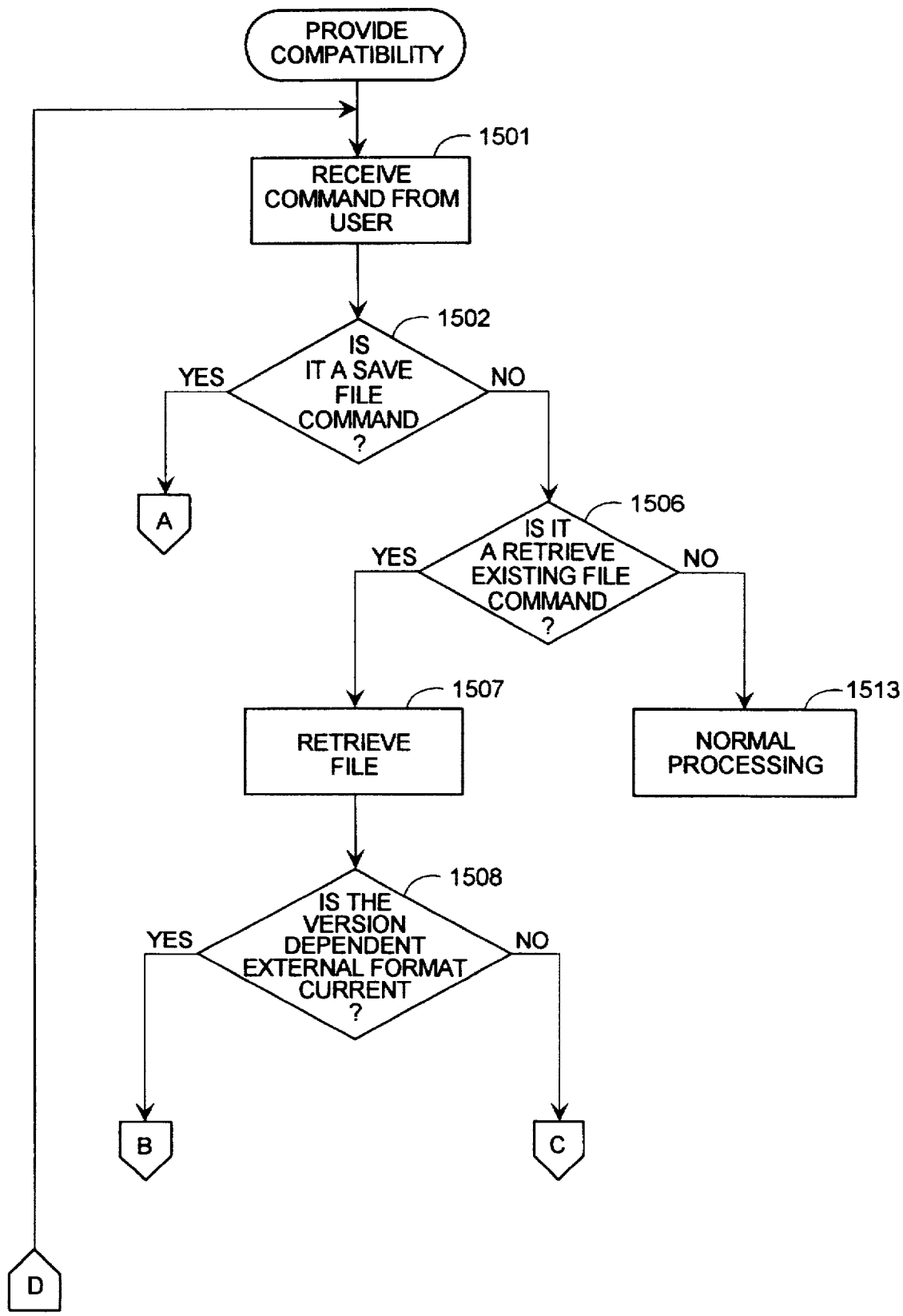
FIG. 15 is a flow diagram of the function ProvideCompatibility.
Figure 15:
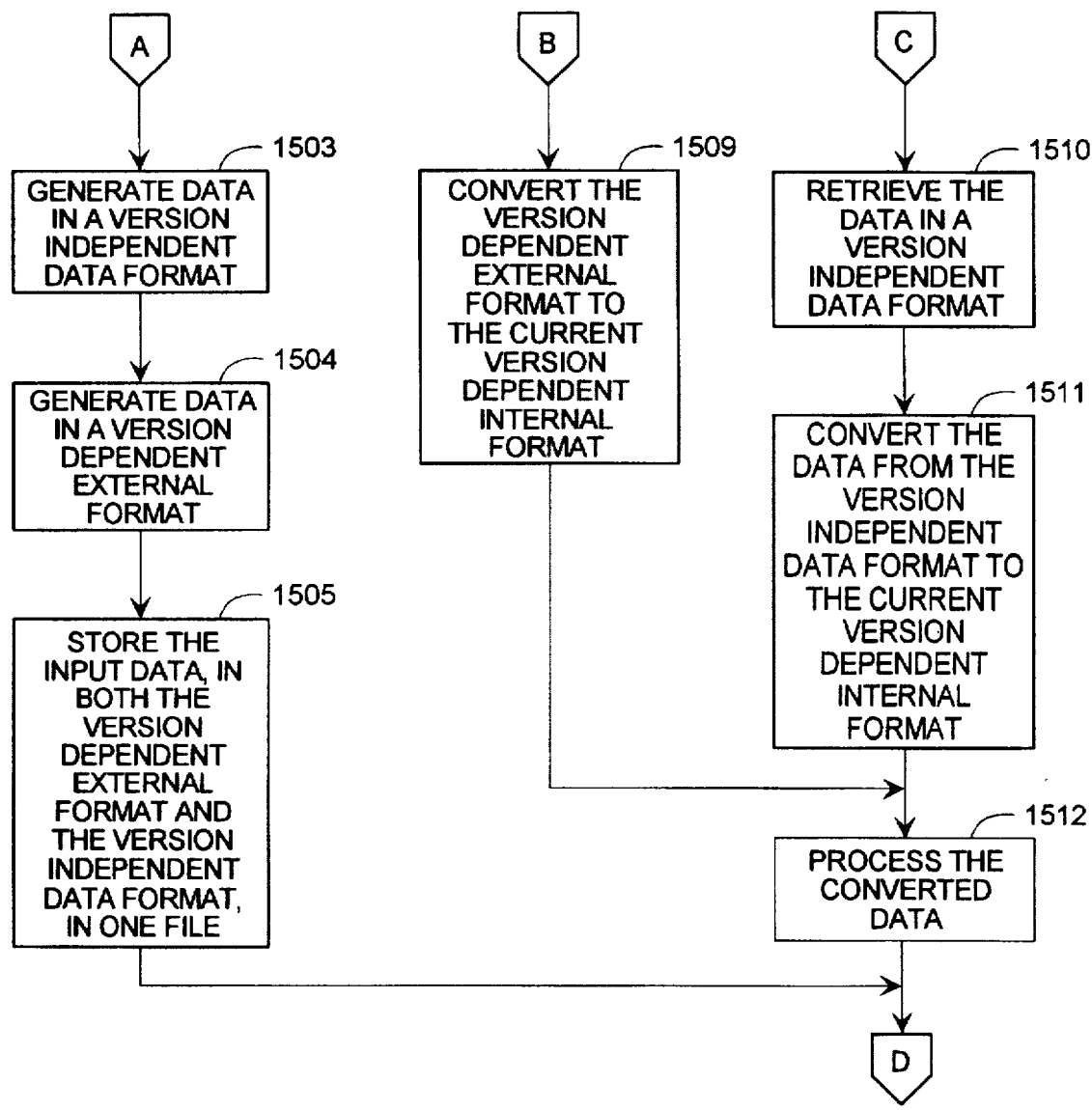

FIG. 15 is a flow diagram of the function ProvideCompatibility which illustrates the preferred method of the present invention used by the system 1200 for providing both backward and forward compatibility between different versions of an application program. In a preferred embodiment of the present invention, the function ProvideCompatibility is performed by the word processing program 1207 (FIG. 12). The method receives input data from a user and stores the input data in a version dependent internal format. After processing the data, the user typically inputs a save file request. The method converts the input data from the version dependent internal format to both a version dependent data format and a version independent data format. The method then stores the input data, in the version independent data format and the version dependent data format, in one file. In this way, other versions of the application program can process the data in the file by converting the data from the version independent data format to the version dependent internal format of the application program currently in use.

In step 1501 of FIG. 15, the function ProvideCompatibility receives a command from the user of the system 1200. In step 1506 the function determines if the command is a SaveFile command. If the command is the SaveFile command, then the function performs steps 1503–1505. In step 1503 the function converts the input data from the version dependent internal format to a version independent data format. In step 1504 the function converts the input data from the version dependent internal format to the version dependent external format. In step 1505 the function stores the input data, in both the version dependent external format and the version independent data format, in one file. Upon completion of step 1505, processing continues with step 1501.

Returning to the discussion of step 1502, if the received command is not a SaveFile command then in step 1506 the function determines if the received command is a RetrieveExistingFile command. If the command is the RetrieveExistingFile command, then the function retrieves the file in step 1507. In step 1508, the function determines if the retrieved file stores its data in the current version dependent external format. If the retrieved file does store its data in the current version dependent external format then processing continues with step 1509. In step 1509 the function converts the data in the retrieved file from the version dependent external format to the current version dependent internal format. In step 1512 the function processes the converted data in the current version dependent internal format. Upon completion of step 1512, processing continues with step 1501.

Returning to the discussion of step 1508, if the version dependent external format of the retrieved file is not the current version dependent external format then processing continues with step 1510. In step 1510 the function retrieves the data in a version independent data format from the retrieved file. In step 1511 the function converts the data from the version independent data format to the current version dependent internal format.

In step 1512 the function ProvideCompatibility processes the data converted to the current version dependent internal format. Upon completion of step 1512 processing continues with step 1501.

Returning to the discussion of step 1506, if the command received in step 1501 is not a RetrieverExistingFile command, then normal processing is performed in step 1513.

Those of ordinary skill in the art will also understand that while the method of the present invention has been described in connection with a word processing program, the method of the present invention can be used by any computer program which stores data on a storage device. Moreover, the present invention can be used to provide compatibility between programs developed by different developers (e.g. two word processing programs) or different types of programs (e.g. a word program and a spreadsheet program).

Thus, it will be appreciated that, although a specific embodiment of the invention has been described herein for purposes of illustration, various modifications may be made without departing from the spirit and scope of the invention. Accordingly, the invention is not limited except as by the appended claims.

I claim:

1. A method executed in a computer system for providing compatibility between a prior version of a computer program and a later version of the computer program, the computer including a memory storing a file with data in both a version dependent external format specific to the prior version of the computer program and data in a version independent data format, the method comprising the steps of:

receiving a request to process the data stored in the file using the later version of the computer program;

determining whether the data stored in the version dependent external format can be processed by the later version of the computer;

when the data can be processed by the later version of the computer program, loading the data into memory;

when the data cannot be processed by the later version of the computer program, retrieving the data in the version independent data format, converting the retrieved data to a version dependent internal format that can be processed by the later version of the computer program, and loading the converted data into memory; and processing the loaded data using the later version of the computer program.

2. A method executed in a computer system for providing compatibility between a later version of a computer program and a prior version of the computer program, the computer including a memory storing a file with data in both a version dependent external format specific to the later version of the computer program and data in a version independent data format, the method comprising the steps of:

receiving a request to process the data stored in the file using the prior version of the computer program;

determining whether the data stored in the version dependent external format can be processed by the prior version of the computer program;

when the data can be processed by the prior version of the computer program, loading the data into memory;

when the data cannot be processed by the prior version of the computer program, retrieving the data in the version independent data format, converting the retrieved data to a version dependent internal format that can be processed by the prior version of the computer program, and loading the converted data into memory; and processing the loaded data using the prior version of the computer program.

3. A method executed in a computer system for providing compatibility between computer programs, the computer including a memory storing a computer program and data, the method comprising the steps of:

under control of the computer program, receiving a request to save the data; and in response to receiving the request, storing the data in a file in an external format specific to the computer programs and storing the data in the file in a version independent format that can be processed by another computer program.

4. The method of claim 3, including the steps of:

retrieving the data from the file in the version dependent external format; and processing the retrieved data using the computer program without converting the retrieved data before processing.

5. A computer system for providing compatibility between a prior version of a computer program and a later version of the computer program, the computer including a memory storing a file with data in both a version dependent external format specific to the prior version of the computer program and data in a version independent data format, the system comprising:

means for receiving a request to process the data stored in the file using the later version of the computer program;

means for determining whether the data stored in the version dependent external format can be processed by the later version of the computer;

when the data can be processed by the later version of the computer program, means for loading the data into memory;

when the data cannot be processed by the later version of the computer program, means for retrieving the data in the version independent data format;

means for converting the retrieved data to a version dependent internal format that can be processed by the later version of the computer program including means for loading the converted data into memory; and means for processing the loaded data using the later version of the computer program.

6. A computer system for providing compatibility between a later version of a computer program and a prior version of the computer program, the computer including a memory storing a file with data in both a version dependent external format specific to the later version of the computer program and data in a version independent data format, the system comprising:

means for receiving a request to process the data stored in the file using the prior version of the computer program;

means for determining if the data stored in the version dependent external format can be processed by the prior version of the computer program;

when the data can be processed by the prior version of the computer program, means for loading the data into memory;

when the data cannot be processed by the prior version of the computer program, means for retrieving the data in the version independent data format, means for converting the retrieved data to a version dependent internal format that can be processed by the prior version of the computer program including means for loading the converted data into memory; and means for processing the loaded data using the prior version of the computer program.

7. A computer system for providing compatibility between computer programs, the computer including a memory storing a computer program and data, the system comprising:

under control of the computer program, means for receiving a request to save the data; and in response to receiving the request, means for storing the data in a file in an external format specific to the computer program; and means for storing the data in the file in a version independent format that can be processed by another computer program.

8. The system of claim 7, further comprising:

means for retrieving the data from the file in the version dependent external format; and means for processing the retrieved data using the computer program without converting the retrieved data before processing.

* * * * *